UNITED STATES PATENT OFFICE.

STEPHEN H. EMMENS, OF LONDON, ENGLAND.

PROCESS OF TREATING ZINC-LEAD-SULFID ORES.

SPECIFICATION forming part of Letters Patent No. 513,490, dated January 30, 1894.

Application filed November 28, 1892. Renewed June 28, 1893. Serial No. 479,090. (No specimens.)

*To all whom it may concern:*

Be it known that I, STEPHEN H. EMMENS, a subject of the Queen of Great Britain and Ireland, and a resident of London, England, temporarily residing at Youngwood, Westmoreland county, in the State of Pennsylvania, have invented a new and useful Improvement in Processes of Treating Argentiferous and Auriferous Zinc-Lead-Sulfid Ores, of which the following is a specification.

The object of this invention is to enable certain so-called "refractory" ores of Colorado and other mining districts to be reduced in a simple and profitable manner. The characteristic feature of these ores is the presence of zinc. This is the refractory element that renders such ores unfit for smelting by ordinary methods, and is highly prejudicial to the efficient smelting of other ores if they be mixed therewith. Hence the successful treatment of the ores in question resolves itself into the problem of separating the zinc from the lead and gold, lead and silver, or lead, gold and silver, with which it is associated.

The present invention consists in an improved method or process for effecting such separation, and is carried into effect in the following manner:

First. The ore is crushed or otherwise comminuted to a suitable degree of fineness, dependent upon its state of aggregation, and upon the quantity and nature of the gangue by which it is accompanied; a crushing to twenty-mesh size being usually sufficient.

Secondly. The finely comminuted ore is roasted in an oxidizing atmosphere in any suitable desulphurizing furnace until the greater portion of the contained sulphur is oxidized; the heat not being allowed to rise materially above dull redness. The effect of this roasting is to convert most of the metallic contents of the ore into sulphates and oxides.

Thirdly. The roasted ore is finely pulverized, and then leached with water containing a small proportion—about one per cent.—of ferrous sulphate. This leaching extracts the zinc sulphate present in the ore, and the ferrous sulphate precipitates any silver that may become dissolved.

Fourthly. The once-leached ore is leached with an aqueous solution of ferric sulphate containing a little ferrous sulphate; the strength of the solution being determined by the percentage of zinc remaining in the ore after the previous leaching. Each pound of zinc requires about two pounds of ferric sulphate for its removal. The object of this second leaching is to dissolve and remove any zinc that may be left by the first leaching in the state of oxide or sulphide.

Fifthly. The ore is again leached with water containing about one per cent. of ferrous sulphate to wash out any liquid remaining from the second leaching, and is then a finished concentrate containing the whole of the original lead, silver and gold, and may be either sold, or reduced to metal, bullion, or matte, by known means.

Sixthly. The water from the third leaching is employed in the first leaching of the next quantity of ore.

Seventhly. The liquids from the first and second leachings are mixed together and heated, the effect produced being that any ferrous sulphate remaining is peroxidized; and then, by filtration, concentration, and cooling, a large portion of the zinc sulphate is recovered in a crystalline form, almost or altogether free from iron.

Eighthly. The mother liquor and precipitate from the seventh stage are mixed together, and treated with sulphurous anhydride ($SO_2$) obtained either from the roasting furnace by known means or from any other convenient source. The effect of this treatment is to produce a solution of mixed zinc and ferrous sulphates.

Ninthly. This mixed solution is electrolyzed by known means, and the zinc thereby separated, leaving a solution of ferric sulphate. A part of this is employed in the second leaching of a further quantity of ore, and the remainder is reduced by means of sulphurous anhydride to ferrous sulphate for addition to the liquids employed in the three leachings of such further quantity of ore.

Certain practical modifications of the herein-described process will suggest themselves to persons skilled in the art. For example, in the case of very refractory ore, or imperfect roasting, one or more additional roastings or leachings may be resorted to; while in the case of very porous ore the second crushing may be dispensed with. Also it will be evident that where the concentrates are sufficiently rich to admit of the presence of a certain percentage of zinc without thereby being rendered unsalable or unfit for smelting, the herein-described leaching operations need not be continued until the whole of the zinc is extracted.

Having thus described the said improvement, I claim as my invention and desire to patent under this specification—

1. The process of treating zinc-lead sulphide ores carrying gold or silver or gold and silver, which said process consists in, first, finely comminuting the ore, secondly, roasting the same in an oxidizing atmosphere, thirdly, leaching such roasted ore with water containing ferrous sulphate, fourthly, leaching such once-leached ore with an aqueous solution of ferrous and ferric sulphates, fifthly leaching such twice-leached ore with water containing ferrous sulphate, and, sixthly, removing iron from the zinc sulphate solution obtained by the first and second of the said leachings by mixing such solutions together and heating them, substantially as hereinbefore specified.

2. In the process of treating argentiferous and auriferous zinc-lead sulphide ores, the extraction of a portion of the zinc contents by subjecting the said ores in a comminuted and well-oxidized condition to lixiviation with an aqueous solution of ferric sulphate containing some ferrous sulphate, substantially as hereinbefore specified.

3. In the process of treating argentiferous and auriferous zinc-lead sulphide ores, the purification of zinc sulphate solutions obtained from such ores, which said purification consists in freeing the solution from all or part of the contained ferrous sulphate by adding to such solutions a solution of ferric sulphate and then heating the combined liquids, substantially as hereinbefore specified.

STEPHEN H. EMMENS.

Witnesses:
S. W. CALDWELL,
JAS. L. ERWIN.